United States Patent
Westerveld

(10) Patent No.: US 9,532,006 B2
(45) Date of Patent: Dec. 27, 2016

(54) BROADCASTING VARIANTS OF DIGITAL SIGNALS IN A CONDITIONAL ACCESS SYSTEM

(75) Inventor: Egbert Westerveld, Deurne (NL)

(73) Assignee: Irdeto B.V., Hoofddorp (NL)

( * ) Notice: Subject to any disclaimer, the term of this patent is extended or adjusted under 35 U.S.C. 154(b) by 420 days.

(21) Appl. No.: 12/983,953

(22) Filed: Jan. 4, 2011

(65) Prior Publication Data

US 2011/0211695 A1    Sep. 1, 2011

(30) Foreign Application Priority Data

Jan. 5, 2010   (EP) .................................... 10150105

(51) Int. Cl.
*H04N 7/16*      (2011.01)
*H04N 7/167*     (2011.01)
(Continued)

(52) U.S. Cl.
CPC ........... *H04N 7/1675* (2013.01); *G06T 1/0021* (2013.01); *H04N 21/23424* (2013.01); *H04N 21/23892* (2013.01); *H04N 21/23897* (2013.01); *H04N 21/234345* (2013.01); *H04N 21/26616* (2013.01); *H04N 21/44016* (2013.01); *H04N 21/44055* (2013.01); *H04N 21/44236* (2013.01); *H04N 21/4623* (2013.01); *H04N 21/8358* (2013.01)

(58) Field of Classification Search
CPC ................ G06T 1/0021; H04N 7/1675; H04N 21/23892; H04N 21/8358; H04N 21/23424
USPC ........................... 380/212, 223, 240; 713/176
See application file for complete search history.

(56) References Cited

U.S. PATENT DOCUMENTS 7,058,809 B2 *   6/2006   White et al. .................. 713/176
2002/0064188 A1   5/2002   Mizobata
(Continued)

FOREIGN PATENT DOCUMENTS

CN       1505355 A       6/2004
CN     101477666 A       7/2009
(Continued)

OTHER PUBLICATIONS

"European Application No. 10150105.4, Extended European Search Report dated May 21, 2010", (May 21, 2010), 8 pgs.
(Continued)

*Primary Examiner* — Hadi Armouche
*Assistant Examiner* — Angela Holmes
(74) *Attorney, Agent, or Firm* — Marc Kaufman; Reed Smith LLP

(57) ABSTRACT

The invention provides a headend system, a receiver, a smartcard and a conditional access system enabling distribution of multiple variants of a part of a digital signal, such as multiple variants of an audio part or a video part of a data stream, without requiring receivers to be updated. The digital signal generated by the headend system enables a receiver to receive and process the digital signal without requiring identification of the copies in the second digital signal. Error handling capabilities of the receiver ensure that only one copy is used in the output of the receiver. The error handling capabilities are triggered by having the receiver use one decryption key for descrambling all copies, resulting in one copy being descrambled correctly and the other copies being descrambled incorrectly.

18 Claims, 13 Drawing Sheets

(51) Int. Cl.

| | | |
|---|---|---|
| G06T 1/00 | (2006.01) | |
| H04N 21/234 | (2011.01) | |
| H04N 21/2343 | (2011.01) | |
| H04N 21/2389 | (2011.01) | |
| H04N 21/266 | (2011.01) | |
| H04N 21/44 | (2011.01) | |
| H04N 21/4405 | (2011.01) | |
| H04N 21/442 | (2011.01) | |
| H04N 21/4623 | (2011.01) | |
| H04N 21/8358 | (2011.01) | |

(56) References Cited

U.S. PATENT DOCUMENTS

| | | | |
|---|---|---|---|
| 2002/0076204 A1 | 6/2002 | Nakano et al. | |
| 2002/0112163 A1* | 8/2002 | Ireton | 713/176 |
| 2003/0009669 A1 | 1/2003 | White et al. | |
| 2003/0021412 A1 | 1/2003 | Candelore et al. | |
| 2004/0123097 A1* | 6/2004 | Ranjan | 713/153 |
| 2004/0170166 A1* | 9/2004 | Cohen | 370/389 |
| 2004/0181666 A1* | 9/2004 | Candelore | 713/160 |
| 2007/0286422 A1 | 12/2007 | Cocchi et al. | |
| 2008/0199007 A1* | 8/2008 | Candelore | 380/201 |
| 2008/0301452 A1* | 12/2008 | Horne et al. | 713/176 |
| 2010/0215173 A1* | 8/2010 | Michiels et al. | 380/28 |
| 2010/0303282 A1* | 12/2010 | Boyd et al. | 382/100 |
| 2011/0107165 A1* | 5/2011 | Resch et al. | 714/746 |

FOREIGN PATENT DOCUMENTS

| | | |
|---|---|---|
| CN | 101681408 A | 3/2010 |
| EP | 1 134 977 A1 | 9/2001 |
| EP | 1 461 952 | 9/2004 |
| EP | 1 486 071 | 12/2004 |
| JP | H1069532 A | 3/1998 |
| JP | 2005514717 A | 5/2005 |
| JP | 2005515726 A | 5/2005 |
| JP | 2006229962 A | 8/2006 |
| JP | 2007521780 A | 8/2007 |
| WO | WO-01/67667 A1 | 9/2001 |

OTHER PUBLICATIONS

Parviainen, R., et al., "Large Scale distributed watermarking of multicast media through encryption", Proceedings of the IFIP TC6/TC11 International Conference on Communications and Multimedia Security Issues of the New Century, (2001), 1-10.

Stenborg, K. G, "Distribution and individual watermarking of streamed content for copy protection", Linkoping Studies in Science and Technology, Thesis No. 1212, (2005), 106 pgs.

Yong, Seunglim, et al., "An Efficient Fingerprinting Scheme with Symmetric and Commutative Encryption", Digital Watermarking Lecture Notes in Computer Science, vol. 3710/2005, (2005), 54-66.

Roland Parviainen, Peter James—"Large Scale Distributed Watermarking of Multicast Media through Encryption", Department of Computer Science/Centre for Distance-spanning Technology, Lulea University of Technology, 2001.

Notice of Reasons for Rejection cited in corresponding Japanese Patent Application No. 2011-000450 dated Oct. 14, 2014.

* cited by examiner

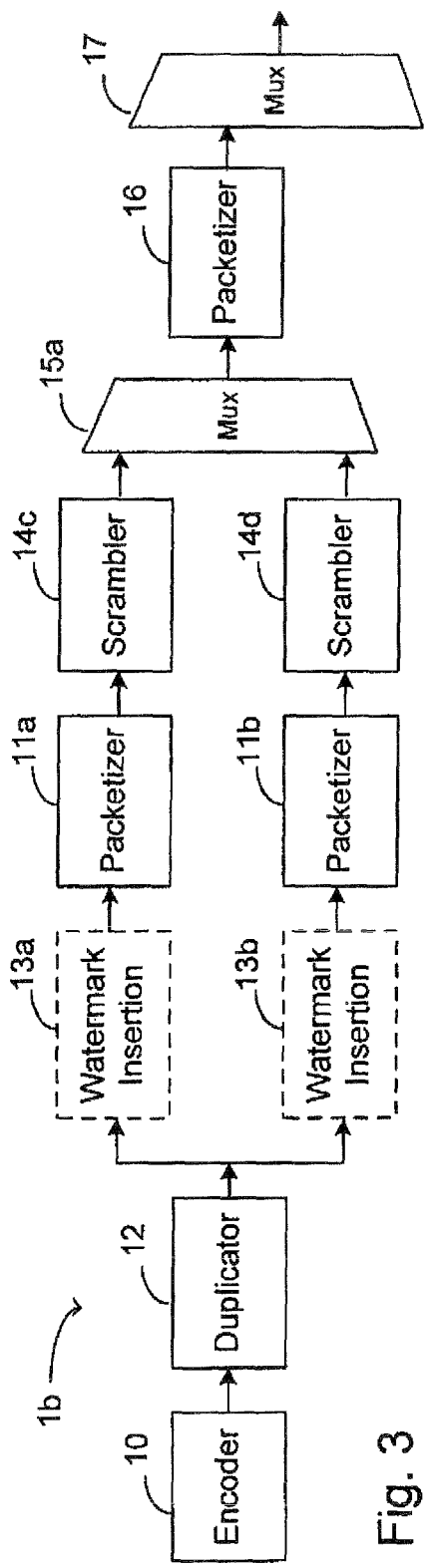
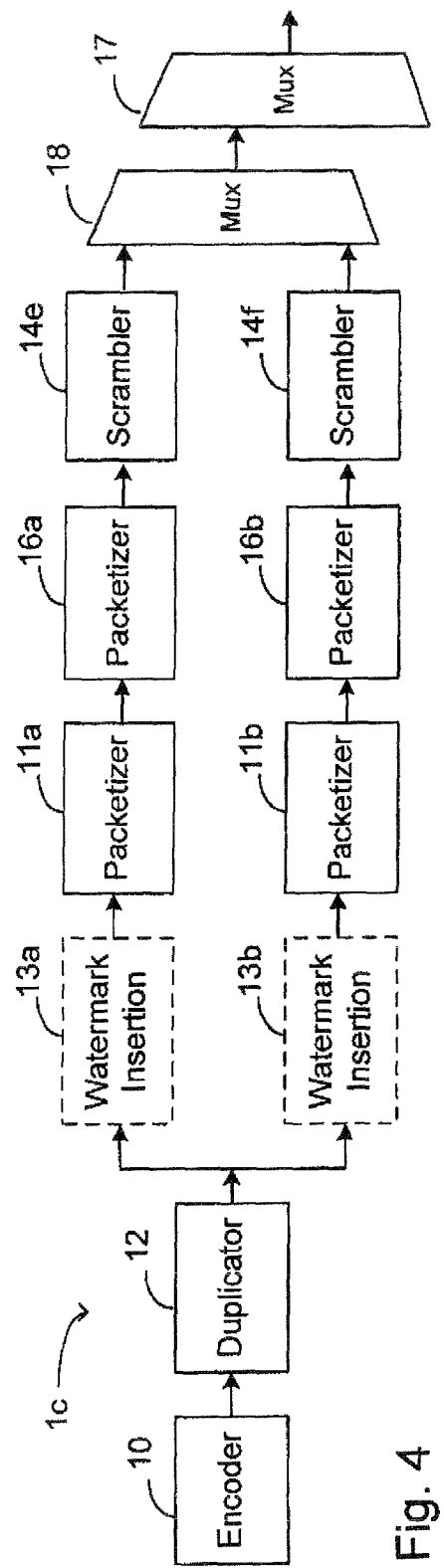
Fig. 3
Fig. 4

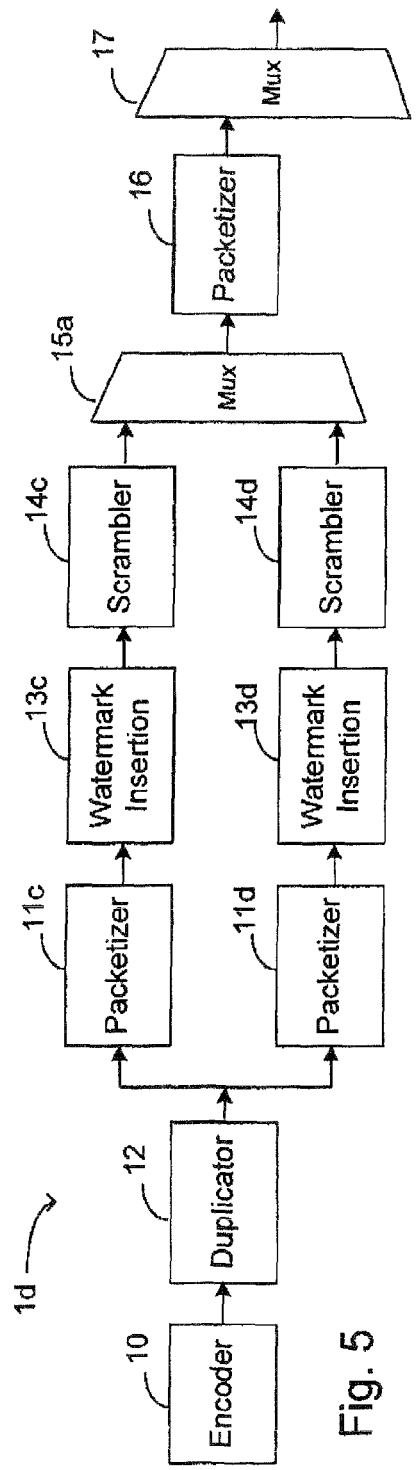
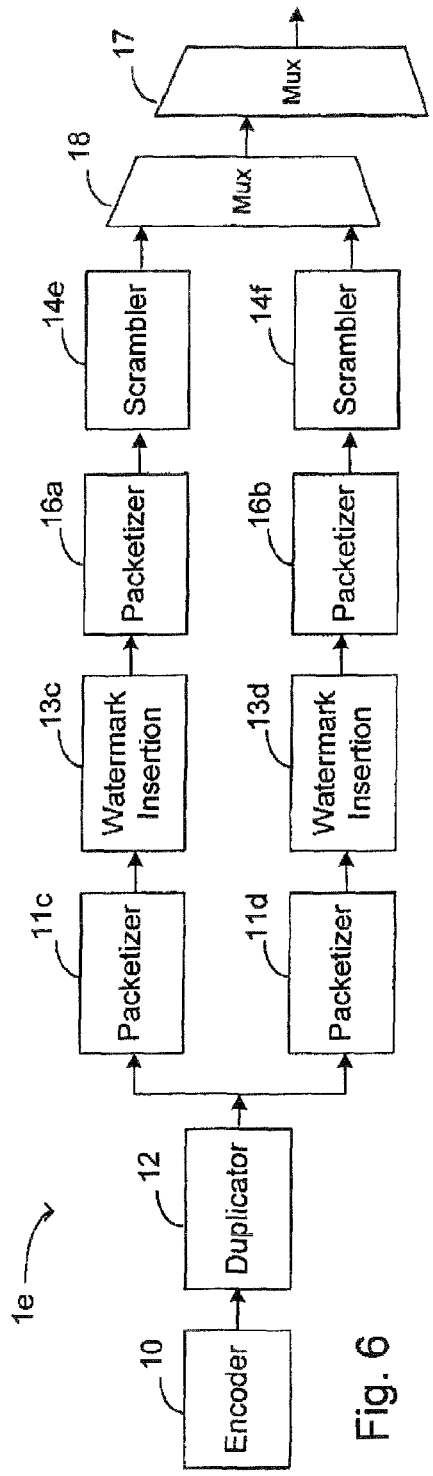

BROADCASTING VARIANTS OF DIGITAL SIGNALS IN A CONDITIONAL ACCESS SYSTEM

CLAIM OF PRIORITY

The present patent application claims the benefit of priority under 35 U.S.C. §119 to European Patent Application No. 10150105.4, filed Jan. 5, 2010, the entire contents of which is incorporated herein by reference.

FIELD OF THE INVENTION

The present invention relates to broadcasting of digital signals, such as digital video broadcasting. More specifically the invention relates to broadcasting different variants of digital signals from a headend system to one or more receivers in a conditional access system.

BACKGROUND

Digital video broadcasting (DVB) is a known technique that can use MPEG-2 for the transmission of content streams multiplexed in a data stream. The MPEG-2 data stream is called a transport stream (TS). A TS comprises one or more content streams called packet elementary streams (PES). A PES has a PES header portion and a PES payload portion.

Provisioning of protected DVB services is typically enabled by conditional access systems. A conditional access system comprises a headend system and a multitude of receivers. Smartcards implement pay TV applications for individual subscribers. The smartcard is, e.g., a credit card sized card with a secure chip that is to be inserted into a conditional access module in the receiver. The smartcard may, e.g., be embedded in the receiver, either as a hardware module or in software.

The main function of a smartcard is the processing of entitlement messages received from the headend system and responding to requests from the receiver. The smartcard obtains a decryption key (also known as control word or CW) from an entitlement control message (ECM) and provides the CW to a descrambler in the receiver to enable decryption of a PES.

In known DVB systems that are compliant with international standard ISO/IEC 13818-1:2000 the PES and TS are generated in the headend system. The headend system receives one or more analog signals, such as audio and/or video signals. An encoder encodes the analog signal into a digital signal. Next, the digital signal is packetized in a packetizer. The packetizer creates the PES packets, including PES header and PES payload. Multiple PES streams are multiplexed in a multiplexer into a multiplexed packet stream. The multiplexed packet stream is scrambled (also called encrypted) by a high speed scrambler into the TS. The TS is provided to a transmission component of the DVB network infrastructure for transmission or broadcasting of the TS to one or more receivers.

Elementary streams are identified by a unique packet identifier (PID) value in a TS packet header. A PES identified with a single PID is called a PID stream. At the receiver a demultiplexer processes the MPEG-2 Transport Stream and outputs packets with the same PID value to a separate output stream. A PID routing table forwards these output streams to the relevant processing module, such as an audio or a video decompression engine.

Each elementary stream is carried in the payload of a TS packet with a PID value that references the elementary stream. In the example of FIG. 17 a PID value for an audio PES 'a1' is shared by all packets that transport the audio of TV program '1'. Similar arrangements exist for the video and EPG elementary streams, which are shown as 'v' and 'e', respectively. In the example of FIG. 17, the audio, video and EPG streams for TV program '1', '2' and '3' (i.e. a1, v1, e1, a2, v2, e2, a3, v3 and e3) are the output of the demultiplexer Demux as well as a separate radio channel 'a4'. The association of PID values with elementary streams and TV programs are contained in MPEG-2 PSI metadata (not shown). The metadata is used to configure a router that—for a selected TV program—sends the elementary streams to the appropriate processing module (e.g., a decoding engine). The router is indicated as element PID routing.

The MPEG-2 Transport Stream transports TS packets sequentially. As a result, each output stream of the demultiplexer carries TS packet data sequentially.

In the example of FIG. 18 three PID streams 'a', 'a*' and 'a**' are shown. PID stream 'a*' and 'a**' are variants originating from a single source of data, e.g., encrypted differently or watermarked differently. In a receiver the PID stream 'a' and PID stream 'a*' can be combined to form a single elementary stream. Alternatively, PID stream 'a' and PID stream 'a**' can be combined to form a single elementary stream. In FIG. 18, a thick line indicates the presence in time of data traffic on a particular PID. The common part of the elementary stream is distributed on PID 'a'. This common part is distributed to a group of receivers. Receiver specific parts of the elementary streams use PIDs 'a*' and 'a**'. In the example of FIG. 18, no data is delivered using PID 'a' when the specific parts are distributed on PIDs 'a*' and 'a**'. In the receiver, the common data stream 'a' and the specific data stream 'a*' or 'a**' are combined to obtain the elementary stream.

The different parts of the data stream can be merged in the receiver by allowing the PID routing table to forward one or more inputs to the same output. This is known as PID switching. FIG. 19 shows an example of known PID switching functionality in a receiver.

The example of FIG. 19 shows elementary streams indicated by subscripts '1' and '2'. Elementary steams indicated by subscript '1' belong to, e.g., a TV program. An audio part of the TV program has three PID streams indicated by audio PID values 'a1', 'a1*' and 'a1**'. A video part of the TV program has three PID streams indicated by video PID values 'v1', 'v1*' and 'v1'. The receiver in the example of FIG. 19 is capable of decoding the elementary audio stream that is constructed by merging the common data part in PID stream 'a1' with the specific data part in PID stream 'a1'. A similar merging is implemented for the video elementary stream by combining data streams from PID steam 'v1' and 'v1**'.

It is known that a specific part of the elementary stream, such as, e.g., 'a*' or 'a**' of FIG. 18, can be encoded with a watermark. Merging of watermarked PID streams similar to the example shown in FIG. 19 produces a watermarked output. By selecting a specific PID stream using the unique PID value of each PES, the receiver can switch between the specific parts of the elementary stream to thereby insert a sequence of watermarks in the output that is unique to the receiver.

Receivers exist that do not support PID switching. The operation of such receivers is typically limited to the functionality shown in the example of FIG. 17. An update of the receiver would be required to add PID switching functionality. Such update involves a hardware and/or a firmware update. For already deployed receivers, changing the hardware is often infeasible. Updating the firmware in already deployed receivers is often difficult as software vendors have typically moved to other receiver designs and do not upgrade firmware of already deployed receivers.

EP1486071 discloses an encryption arrangement for multiple encryption of television programs. In EP1485071 duplicate packets each have a unique PID.

EP1461952 discloses an encryption arrangement for multiple encryption programs. PID mapping techniques are used to distinguish between multiple encryptions.

Broadcasters with a significant infrastructure of relatively old receivers have a need for PID switching like functionality. These infrastructures are commonly used by Pay TV broadcasters. The restrictions of existing receivers limit the deployment of new features present in modern receivers as it often results in the need for multiple versions of elementary streams. The benefits of PID switching would extend the lifetime of such infrastructures at an affordable bandwidth cost.

There is a need for a solution that enables distribution of multiple variants of a part of a data stream, such as multiple variants of an audio part or a video part of the data stream, without requiring receivers to be updated.

SUMMARY OF THE INVENTION

According to an aspect of the invention a headend system is proposed. The headend system comprises a duplicator configured to generate two or more copies of at least a part of a first digital signal. The Headend system optionally further comprises one or more watermark insertion modules configured to insert a watermark in each copy to obtain watermarked copies of the first digital signal, wherein the watermark is different for each copy. The headend system further comprises one or more scramblers configured to scramble each copy to obtain scrambled copies of the first digital signal, wherein each copy is scrambled differently. The headend system further comprises a combiner configured to combine the scrambled copies to obtain a second digital signal wherein the scrambled copies are not identifiable as being related to one of the two or more copies of the first digital signal.

According to an aspect of the invention a method is proposed for use in a headend system having one or more of the above mentioned features. The method comprises the step of generating two or more copies of at least a part of a first digital signal. The method optionally further comprises the step of inserting a watermark in each copy to obtain watermarked copies of the first digital signal, wherein the watermark is different for each copy. The method further comprises the step of scrambling each copy to obtain scrambled copies of the first digital signal. Each copy is scrambled differently. The method further comprises the step of combining the scrambled copies to obtain a second digital signal wherein the scrambled copies are not identifiable as being related to one of the two or more copies of the first digital signal.

The scrambled copies are not identifiable as being related to one of the two or more copies of the first digital signal. This means that, e.g., two copies of a PES packet have the same PID. As a result, from the PES packets it cannot be derived that they are copies and a receiver of the PES packets will process all copies.

In the second digital signal the processed copies are not identifiable as being related to a single one of the copies of the first digital signal. Thus, in the second digital signal the processed copies cannot be identified as being copies as opposed to, e.g., PID switching technology. The second digital signal appears not to contain any copies.

Meaningful output is output that can be decoded for display on an end-user device, such as, e.g., a video output, audio output, EPG output, or a combination of video and audio in a television output. Non-meaningful output is output that cannot be decoded for display on an end-user device, because essential information is missing in the non-meaningful output. An example of such essential information is PES packet header information required for decoding a PES packet payload. Another example is a MPEG-2 data element in a PES packet payload, such as an I-frame, a P-frame or a B-frame data element used for video encoding.

The second digital signal thus generated by the headend system enables a receiver to receive and process the second digital signal without requiring identification of the copies—e.g., by PID—in the second digital signal. Error handling capabilities of the receiver ensure that only one copy is used in the output of the receiver. Advantageously, the receiver does not require an update for processing the second digital signal according to the invention, because the error handling capabilities are typically available in the receiver.

The error handling capabilities are, e.g., triggered by having the receiver use one decryption key for descrambling all copies, resulting in one copy being descrambled correctly and the other copies being descrambled incorrectly resulting in random data for the other copies.

The optionally inserted watermark can advantageously be revealed in an output of a receiver of the second digital signal under the control of the headend system.

The embodiment of claim 2 advantageously enables packetization of the copies before scrambling.

The embodiment of claim 3 advantageously enables the watermark to be inserted after packetization of the copies.

The embodiment of claim 4 advantageously enables packetization of the first digital signal before generating the copies.

The embodiment of claim 5 advantageously enables packetization of the copies before scrambling.

The embodiment of claim 6 advantageously enables each packetized copy including the header to be scrambled.

The embodiments of claims 7 and 13 advantageously enable the headend system to control which copy is to be descrambled in a receiver by providing a decryption key to the receiver for correctly descrambling only one of the copies.

The embodiment of claim 8 advantageously enables multiple decryption keys to be provided to a receiver from which the receiver selects one key using the selection data.

According to an aspect of the invention a receiver is proposed for receiving a second digital signal and an entitlement message from a headend system having one or more of the above mentioned features. The second digital signal comprises two or more scrambled copies of a first digital signal wherein the scrambled copies are not identifiable as being related to one of two or more copies of the first digital signal. The entitlement message comprises key data for two or more decryption keys. The entitlement message further comprises selection data. The receiver comprises a decryptor configured to obtain the key data and the selection data from the entitlement message. The receiver further comprises a memory comprising a fingerprint vector. The receiver further comprises a matching module configured to match the selection data with the fingerprint vector to obtain a matching result. The receiver comprises a key selector configured to obtain one decryption key from the key data based on the matching result to enable the receiver to descramble one of the scrambled copies into a meaningful output and to descramble all other scrambled copies into a non-meaningful output.

The second digital signal thus received from the headend system enables the receiver to receive and process the second digital signal without requiring identification of the copies in the second digital signal. Error handling capabilities of the receiver ensure that only one copy is used in the output of the receiver. The error handling capabilities are triggered by having the receiver use one decryption key for descrambling all copies, resulting in one copy being descrambled correctly and the other copies being descrambled incorrectly resulting in random data for the other copies.

According to an aspect of the invention a smartcard is proposed for use in a receiver for receiving a second digital signal and an entitlement message from a headend system having one or more of the above mentioned features. The second digital signal comprises two or more scrambled copies of a first digital signal. The scrambled copies are not identifiable as being related to one of two or more copies of the first digital signal. The entitlement message comprises key data for two or more decryption keys. The entitlement message further comprises selection data. The smartcard comprises an input module configured to receive the entitlement message from the receiver. The smartcard further comprises a decryptor configured to obtain the key data and the selection data from the entitlement message. The smartcard further comprises a memory comprising a fingerprint vector. The smartcard further comprises a matching module configured to match the selection data with the fingerprint vector to obtain a matching result. The smartcard further comprises a key selector configured to obtain one decryption key from the key data based on the matching result to enable the receiver to descramble one of the scrambled copies into a meaningful output and to descramble all other scrambled copies into a non-meaningful output.

According to an aspect of the invention a smartcard is proposed for use in a smartcard having on or more of the above mentioned features. The method comprises the step of receiving an entitlement message from a receiver. The entitlement message comprises key data for two or more decryption keys. The entitlement message further comprising selection data. The method further comprises the step of decrypting the entitlement message to obtain the key data and the selection data. The method further comprises the step of reading a fingerprint vector from a memory. The method further comprises the step of matching the selection data with the fingerprint vector to obtain a matching result. The method further comprises the step of obtaining one decryption key from the key data based on the matching result to enable the receiver to descramble a first scrambled copy of a digital signal into a meaningful output and to descramble a second scrambled copy of the digital signal into a non-meaningful output.

The second digital signal thus received from the headend system in the receiver enables the receiver to receive and process the second digital signal without requiring identification of the copies in the second digital signal. Error handling capabilities of the receiver ensure that only one copy is used in the output of the receiver. The error handling capabilities are triggered by having the receiver use one decryption key provided by the smartcard for descrambling all copies, resulting in one copy being descrambled correctly and the other copies being descrambled incorrectly resulting in random data for the other copies.

According to an aspect of the invention a conditional access system is proposed comprising a headend system having one or more of the above mentioned features and advantages and one or more receivers having one or more of the above mentioned features and advantages.

According to an aspect of the invention a conditional access system is proposed comprising a headend system having one or more of the above mentioned features and advantages, one or more receivers having one or more of the above mentioned features and advantages and one or more smartcards having one or more of the above mentioned features and advantages.

According to an aspect of the invention use of an error handler in a receiver is proposed for obtaining one copy from the two or more scrambled copies received in a second digital signal. The second digital signal is received from a headend system having one or more of the above mentioned features. The scrambled copies are not identifiable as being related to one of the two or more copies of the first digital signal. The receiver is configured to descramble the two or more scrambled copies using a decryption key to thereby descramble one of the scrambled copies into a meaningful output and to descramble all other scrambled copies into a non-meaningful output. The error handler is configured to discard the non-meaningful output.

The second digital signal received in the receiver is advantageously processed without requiring identification of the copies in the second digital signal. The error handler of the receiver ensures that only one copy is used in the output of the receiver. The error handler is triggered by having the receiver use one decryption key for descrambling all copies, resulting in one copy being descrambled correctly and the other copies being descrambled incorrectly resulting in random data for the other copies.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which:

FIG. 3 shows a headend system of an exemplary embodiment of the invention, wherein a copy of a digital signal is packetized after being watermarked;

FIG. 4 shows a headend system of an exemplary embodiment of the invention, wherein a copy of a digital signal is packetized after being watermarked and wherein watermarked data packets are converted into smaller data packets before being scrambled;

FIG. 5 shows a headend system of an exemplary embodiment of the invention, wherein a copy of a digital signal is packetized before being watermarked;

FIG. 6 shows a headend system of an exemplary embodiment of the invention, wherein a copy of a digital signal is packetized before being watermarked and wherein watermarked data packets are converted into smaller data packets before being scrambled;

DETAILED DESCRIPTION OF THE DRAWINGS

Figure 1:
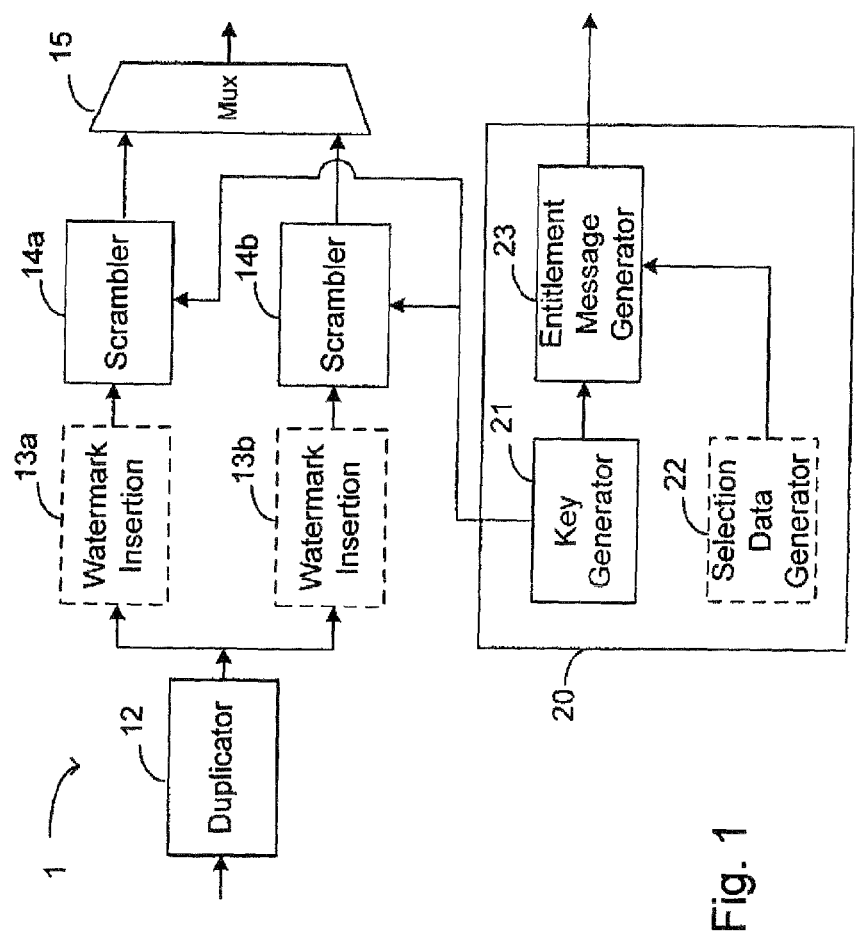
FIG. 1 shows the basic elements of a headend system of an exemplary embodiment of the invention, wherein a digital signal originating from a single source is processed.

The invention makes use of error handling capabilities of existing and future receivers. The error handling capabilities are typically implemented in a software implemented or a hardware implemented error handling module of a receiver. Error handling capabilities are typically used to overcome transmission errors between a headend system and the receiver that can result in missing data elements or damaged data structures in the data stream, making it impossible to further process the data stream in the receiver.

When there are short sequences of errors, known error handling modules will attempt to resume decoding as quickly as possible to reduce any degradation in the analog output, which could be observed by the end-user. A loss of one or more data packets in the data stream results in a temporary interruption in the processing of the data stream and triggers the error handling module to apply an error handling technique that resumes processing of the data stream after the detection of a synchronization point in the content stream.

The error handling module in an MPEG-2 receiver typically uses the PES header as synchronization point. The error handling module searches the audio PES and/or video PES for a predefined 'packet_start_code_prefix' bit pattern that indicates the start of the PES header, as defined by international standard ISO/IEC 13818-1:2000. When the 'packet_start_code_prefix' bit pattern is detected, the PES will be processed from that point onwards.

The invention enables the distribution of multiple variants of a part of a data stream, such as an audio PES or a video PES, without requiring receivers to be updated.

One of the advantages of the invention is that it enables watermarking functionality to the conditional access system wherein the headend system can control the generation of a fingerprint at a particular receiver, without requiring the receiver to be updated.

Watermarking belongs to the technology field of steganography that deals with hiding an information signal in a data stream such that is substantially impossible to detect by human observers. The watermark information is substantially irremovable and is immune to manipulation of analog signals, such as audio and/or video signals, that are decoded from the data stream.

A data stream typically comprises one or more content streams, such as, e.g., an audio and/or video stream or digital TV stream. Typically, the watermark is inserted into the content stream at a sender such that it can be detected in the analogue domain after decoding in a receiver.

The information contained in the watermark generally serves to record the path from a studio to a broadcaster. Typically, no further downstream information can be included as the watermark is applied at the broadcast headend or in the analogue copy obtained from the video content rights holder at the studio.

A fingerprint is a specific type of watermark that is inserted further down the broadcast chain. A fingerprint typically contains information that identifies a receiver of the data stream. Fingerprint information is used in a wide range of forensic applications.

Known watermarking solutions require the use of specific hardware and/or software functionality in the receiver. For already deployed receivers the addition of watermarking capabilities requires an update to firmware. Existing receivers may not have technical hardware capabilities to implement watermarking functionality or it may be impossible to create new firmware, e.g., due to lack of support from a receiver manufacturer.

FIG. 1 shows basic elements of a headend system 1 of an exemplary embodiment of the invention, wherein a digital signal originating from a single source can be processed. Arrows indicate data flows between the elements of the headend system. The headend system 1 received a digital signal from an external source. The digital signal is, e.g., a digital audio signal or a digital video signal. Alternatively the digital signal originates from within the headend system, e.g., from a storage (not shown) or from an encoder (not shown) that encodes an analog signal, such as an analog audio signal or analog video signal, into the digital signal. A duplicator 12 creates a number of copies of at least a part of the digital signal. Each copy will be processed into a variant of the part of the digital signal. In FIG. 1 the headend system 1 is arranged for the generation and processing of two copies. It is possible to arrange the headend system for the generation and processing of more than two copies.

Each copy of the digital signal is provided to a scrambler 14a,14b for scrambling the digital signal. Any known scrambling process can be used in the scrambler 14a,14b. The scrambling is different for each copy of the digital signal. It is possible to configure the headend system 1 to not scramble one or more digital signals.

To scramble the copies differently, the copies can be scrambled using different encryption schemes and/or using different encryption keys. The CW used for scrambling the digital signal is, e.g., different for each copy of the digital signal.

A multiplexer 15 multiplexes the processed copies of the digital signal into a content stream. In the content steam the processed copies are not identifiable as being related to a single one of the copies of the first digital signal. Thus, in the content stream the processed copies cannot be identified as being copies and the content stream appears to be a conventional encrypted stream. The content stream is transmitted or broadcast to one or more receivers.

The content stream generated by the headend system 1 thus contains a first copy of a digital signal that is scrambled using a first encryption scheme and/or with a first encryption key, and a second copy of the digital signal that is scrambled using a second encryption scheme different from the first encryption scheme and/or with a second encryption key different from the first encryption key.

For each copy of the digital signal, a watermark insertion module 13a,13b optionally processes the copy of the digital signal by changing the encoding of the packets into a form that will produce a hidden signal in the analogue output after decoding of the digital signal in a receiver of the digital signal. The thus inserted watermarking forms a part of a longer fingerprint sequence that can be generated by the receiver, as will be explained. Typically, multiple digital signals are processed by the headend system 1 to form the entire fingerprint.

As an example the watermark insertion module 13a and the watermark insertion module 13b each generate a single bit watermark for insertion into a copy of the digital signal as part of a fingerprint. The first copy of the digital signal is inserted with a bit value '0' by watermark insertion module 13a. The second copy of the digital signal is inserted with a bit value '1' by watermark insertion module 13b. As both bit values are encoded in the two respective instances of the copied digital signal, a selective processing of digital signal in the receiver, whereby only one of the two copies can be correctly decoded, embeds the intended bit value as a watermark in the analog output of the receiver. In order to generate a longer sequence of bits as a fingerprint, multiple digital signals are watermarked as described.

Each watermarked digital signal is provided to the scrambler 14a,14b for scrambling the watermarked digital signal similar to the scrambling of copies of the digital signal.

The content stream generated by the headend system 1 including the optional watermarking insertion module 14a,14b thus contains a first copy of a digital signal that is watermarked with a bit value '0' and scrambled using a first encryption scheme and/or with a first encryption key, and a second copy of the digital signal that is watermarked with a bit value '1' and scrambled using a second encryption scheme different from the first encryption scheme and/or with a second encryption key different from the first encryption key.

The CWs used by each scrambler 14a,14b are generated in an encryption key generator 21, i.e. a CW generator 21 in case of the generation of CWs. The CW to be used by a receiver of the content stream for descrambling only one copy of the digital signal is securely stored in an entitlement message, such as an ECM, by entitlement message generator 23 in any manner known per se. The ECM is transmitted from the headend system to the receiver, which is indicated by the arrow leaving the entitlement message generator 23. Typically the receiver will forward the ECM to a smartcard for extraction of the CW from the ECM.

In a scenario where the ECM is transmitted or broadcast to more than one receiver, the headend system can include all CWs used for scrambling the copies of the digital signal in the ECM. To enable the receiver and/or smartcard to select a single CW from the ECM to thereby generate a particular fingerprint in the decoded analog signal, a selection data generator 22 generates selection data which is included in the ECM. With this selection data the receiver or smartcard selects the particular CW from the ECM, as will be described in the examples of FIG. 11 and FIG. 12.

The part of the headend system 1 comprising the encryption key generator 21, selection data generator 22 and entitlement message generator 23 is indicated in FIG. 1 as CW control part 20.

Figure 2:
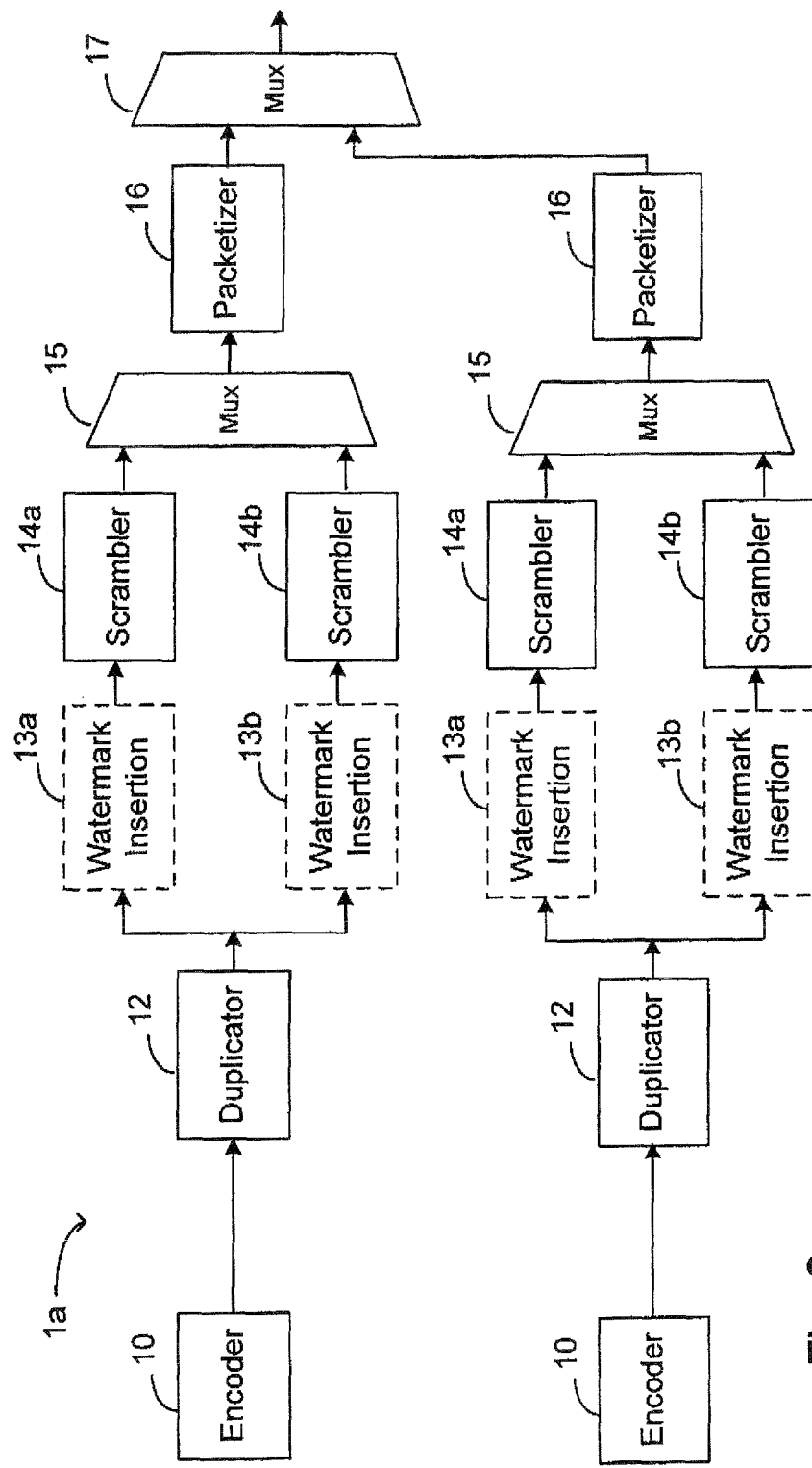
FIG. 2 shows a headend system of an exemplary embodiment of the invention, wherein digital signals from two sources are processed and multiplexed.

FIG. 2 shows an example of a headend system 1a, wherein digital signals from two sources can be processed and multiplexed. A CW control part 20 as shown in FIG. 1 is not shown in FIG. 2, but is typically a part of the headend system 1a. The headend system 1a shown in FIG. 2 contains the elements of the headend system of FIG. 1 in two-fold. A first digital signal is, e.g., a digital audio signal that is generated from an analog audio signal by a first encoder 10 shown in the top left of FIG. 2. A second digital signal is, e.g., a digital video signal that is generated from an analog video signal by a second encoder 10 shown in the bottom left of FIG. 2.

In the example of FIG. 2, each of the content streams generated by the multiplexer 15 are each packetized into smaller packets by a packetizer 16. This enables a more efficient transmission of the content streams. The processed and packetized content streams are further multiplexed in multiplexer 17 into a data stream to be transmitted or broadcast to the receivers.

FIG. 3 shows a headend system 1b of an exemplary embodiment of the invention, wherein copies of a digital signal are packetized. A CW control part 20 as shown in FIG. 1 is not shown in FIG. 3, but is typically a part of the headend system 1b. Arrows indicate data flows between the elements of the headend system. The headend system 1b is arranged to process a digital signal, such as a digital audio signal or a digital video signal. In the example of FIG. 3 the digital signal originates from within the headend system from an encoder 10 that encodes an analog signal, such as an analog audio signal or analog video signal, into the digital signal. A duplicator 12 creates a number of copies of at least a part of the digital signal and forwards each copy to a packetizer 11a,11b. Optionally each copy is processed by a watermark insertion module 13a,13b before being packetized. In FIG. 3 the headend system 1b is arranged for generating and processing two copies. It is possible to arrange the headend system for generating and processing more than two copies.

The optional watermark insertion module 13a,13b processes the copy of the digital signal similar to the example of FIG. 1.

A packetizer 11a,11b packetizes the digital signal or watermarked digital signal into one or more data packets each having a header and a payload. The data packets are, e.g., PES packets.

The PES packet is provided to a scrambler 14c,14d for scrambling the payload of the PES packet. Any known scrambling process can be used in the scrambler 14c,14d. The encryption scheme and/or the encryption key that is used for scrambling the PES packet is different for each copy of the digital signal. It is possible to configure the headend system 1b to not scramble one or more PES packets. For scrambled PES packets the scrambling control field in the PES header of the PES packet is modified accordingly. The PID of the copies of the PES packet is kept the same.

A multiplexer 15a multiplexes the processed copies of the digital signal into a content stream.

The content stream generated by the headend system 1b of FIG. 3 thus contains a first PES from a first copy of a digital signal that is optionally watermarked with a bit value '0' and that is scrambled using a first encryption scheme and/or with a first encryption key, and a second PES from a second copy of the digital signal that is optionally watermarked with, e.g., a bit value '1' and that is scrambled using a second encryption scheme different from the first encryption scheme and/or with a second encryption key different from the first encryption key.

Optionally the content stream is further packetized into smaller packets by packetizer 16, similar to the example of FIG. 2. Hereby the stream of PES packets generated by the PES multiplexer 15a can be converted into a stream of TS packets in the packetizer module 16. Optionally, multiple streams of TS packets are further multiplexed in multiplexer 17 into a TS data stream, similar to the example of FIG. 2.

A receiver of scrambled PES packets can be compatible with PES level descrambling, but not all receivers support PES level descrambling. To enable receivers that are not capable of PES level descrambling to process the scrambled PES packets, an alternative scrambling process can be used in a headend system.

FIG. 4 shows a headend system 1c of an exemplary embodiment of the invention that is arranged for such alternative scrambling process. In the headend system 1c the entire PES packet including the PES header is scrambled. The alternative scrambling process enables scrambling in the headend system 1c at the PES level while descrambling in the receiver is performed at TS level.

Similar to the exemplary embodiment of FIG. 3, in the exemplary embodiment of FIG. 4 the digital signal is copied in duplicator 12 and each copy is processed in a watermarking (optional) and scrambling chain. A CW control part 20 as shown in FIG. 1 is not shown in FIG. 4, but is typically a part of the headend system 1c. In the headend system 1c a copy of a digital signal is packetized into PES packets in a first packetizer 11a,11b, optionally after being watermarked. The thus created PES packets are converted into smaller data packets, such as TS packets, in a second packetizer 16a,16b. The payloads of the TS packets, i.e. including the PES header, is scrambled in scrambler 14e,14f.

A multiplexer 18 multiplexes the scrambled TS packets of the copies of the digital signal into a content stream. Within the content stream the TS packets of each copy of the digital signal are grouped together. The output of multiplexer 18 thus contains, e.g., a first series of TS packets containing in the TS packet payload a first watermarked and scrambles PES packet from a first copy of a digital signal, followed by a second series of TS packets containing in the TS packet payload a second watermarked and scrambles PES packet from a second copy of the digital signal in the TS packet payload.

Optionally, multiple content streams of TS packets are multiplexed in multiplexer 17 into a TS data stream.

FIG. 5 shows a headend system 1d of an exemplary embodiment of the invention, wherein a copy of a digital signal is packetized before being watermarked. A CW control part 20 as shown in FIG. 1 is not shown in FIG. 5, but is typically a part of the headend system 1d. Arrows indicate data flows between the elements of the headend system. The headend system 1d is arranged to process a digital signal, such as a digital audio signal or a digital video signal. In the example of FIG. 5 the digital signal originates from within the headend system from an encoder 10 that encodes an analog signal, such as an analog audio signal or analog video signal, into the digital signal. A duplicator 12 creates a number of copies of at least a part of the digital signal and forwards each copy to a packetizer 11a,11b. In FIG. 5 the headend system 1d is arranged for generating and processing two copies. It is possible to arrange the headend system for generating and processing more than two copies.

The packetizer 11a,11b packetizes the digital signal into one or more data packets each having a header and a payload. The data packets are, e.g., PES packets.

A watermark insertion module 13c,13d adds a watermark to a PES packet by changing the payload of the PES packet such that a hidden signal will be produced in the analogue output after decoding of the PES packets in a receiver of the PES packets. The thus inserted watermarking forms a part of a longer fingerprint sequence that can be generated by the receiver, as will be explained. Typically, multiple PES packets are processed by the headend system 1d to form the entire fingerprint.

As an example the watermark insertion module 13c and the watermark insertion module 13d each generate a single bit watermark for insertion into the payload of a PES packet of a copy of the digital signal as part of a fingerprint. The first PES packet payload of a first copy of the digital signal is inserted with a bit value '0' by watermark insertion module 13c. The second PES packet payload of a second copy of the digital signal is inserted with a bit value '1' by watermark insertion module 13d. As both bit values are watermarked in the two respective instances of the PES packet, a selective processing of PES packets in the receiver, whereby only one of the two copies can be correctly decoded, embeds the intended bit value as a watermark in the analog output of the receiver. In order to generate a longer sequence of bits as a fingerprint, multiple PES packets are watermarked as described.

The watermarked PES packets are provided to a scrambler 14c,14d for scrambling the payload of the PES packets. Any known scrambling process can be used in the scrambler 14c,14d. The encryption scheme and/or the encryption key that is used for scrambling the PES packets is different for each copy of the digital signal. It is possible to configure the headend system 1d to not scramble one or more PES packets. For scrambled PES packets the scrambling control field in the PES header is modified accordingly.

A multiplexer 15a multiplexes the processed copies of the digital signal into a content stream.

Similar to the content stream generated by the headend system 1b of FIG. 3, the content stream generated by the headend system 1d of FIG. 5 thus contains a first series of PES packets from a first copy of a digital signal that is, e.g., watermarked with a bit value '0' and scrambled using a first encryption scheme and/or with a first encryption key, and a second series of PES packets from a second copy of the digital signal that is watermarked with, e.g., a bit value '1' and scrambled using a second encryption scheme different from the first encryption scheme and/or with a second encryption key different from the first encryption key.

Optionally the content stream is further packetized into smaller packets by packetizer 16, similar to the example of FIG. 2. Hereby the stream of PES packets generated by the PES multiplexer 15a can be converted into a stream of TS packets in the packetizer module 16. Optionally multiple streams of TS packets are multiplexed in multiplexer 17 into a TS data stream, similar to the example of FIG. 2.

FIG. 6 shows a headend system 1e of an exemplary embodiment of the invention that is arranged for an alternative scrambling process, wherein the entire PES packet including the PES header is scrambled. A CW control part 20 as shown in FIG. 1 is not shown in FIG. 6, but is typically a part of the headend system 1e. The alternative scrambling process enables scrambling in the headend system 1e at the PES level and descrambling in the receiver at TS level.

Similar to the exemplary embodiment of FIG. 5, in FIG. 6 the digital signal is copied in duplicator 12 and each copy is processed in a packetizing, watermarking and scrambling chain. Each chain starts with the packetizing of the digital signal into PES packets in a first packetizer 11c,11d, followed by the insertion of a watermark by a watermark insertion module 13c,13d.

In the headend system 1e the thus created watermarked PES packets are further processed by second packetizer 16a,16b, scrambler 14e,14f, PES level multiplexer 18 and TS level multiplexer 17 as described in the example of FIG. 4.

Figure 7:
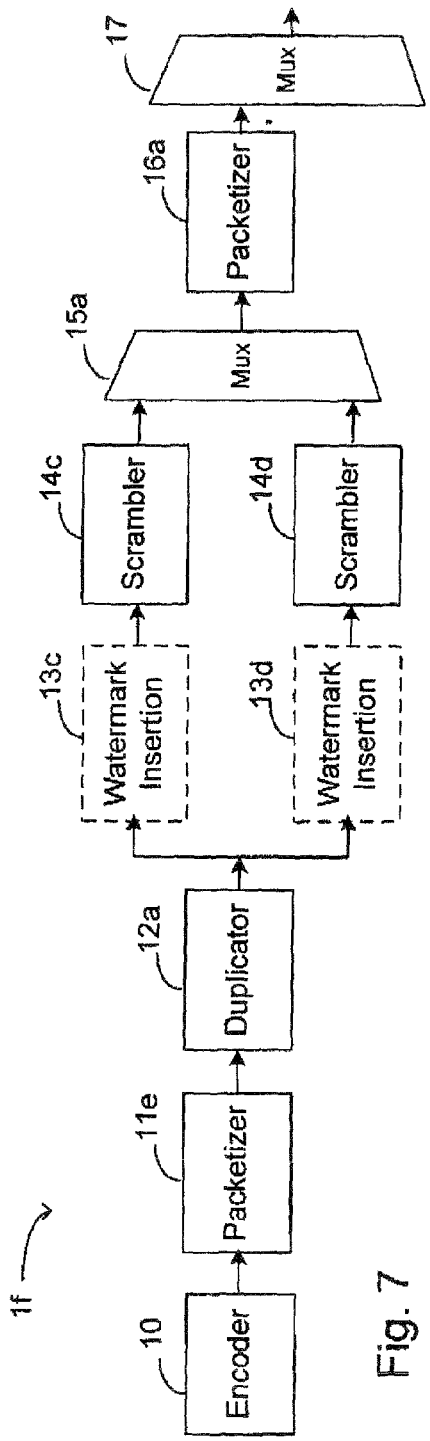
FIG. 7 shows a headend system of an exemplary embodiment of the invention, wherein a digital signal is packetized before being copied.

FIG. 7 shows a headend system 1f of an exemplary embodiment of the invention, wherein a digital signal is packetized before being copied. A CW control part 20 as shown in FIG. 1 is not shown in FIG. 7, but is typically a part of the headend system 1f. Arrows indicate data flows between the elements of the headend system. The headend system 1f is arranged to process a digital signal, such as a digital audio signal or a digital video signal. In the example of FIG. 7 the digital signal originates from within the headend system from an encoder 10 that encodes an analog signal, such as an analog audio signal or analog video signal, into the digital signal.

A packetizer 11e packetizes the digital signal into one or more data packets such as PES packets, each having a header and a payload.

A duplicator 12a creates a number of copies of one or more of the PES packets. In FIG. 7 the headend system 1f is arranged for generating and processing two copies. It is possible to arrange the headend system for generating and processing more than two copies.

In the headend system 1f of FIG. 7 each copy of the PES packet is optionally processed in watermark insertion module 13c,13d. Each copy of the PES packet is processed in scrambler 14c,14d, PES level multiplexer 15a, second packetizer 16 and TS level multiplexer 17 as described for headend system 1d in FIG. 5.

Figure 8:
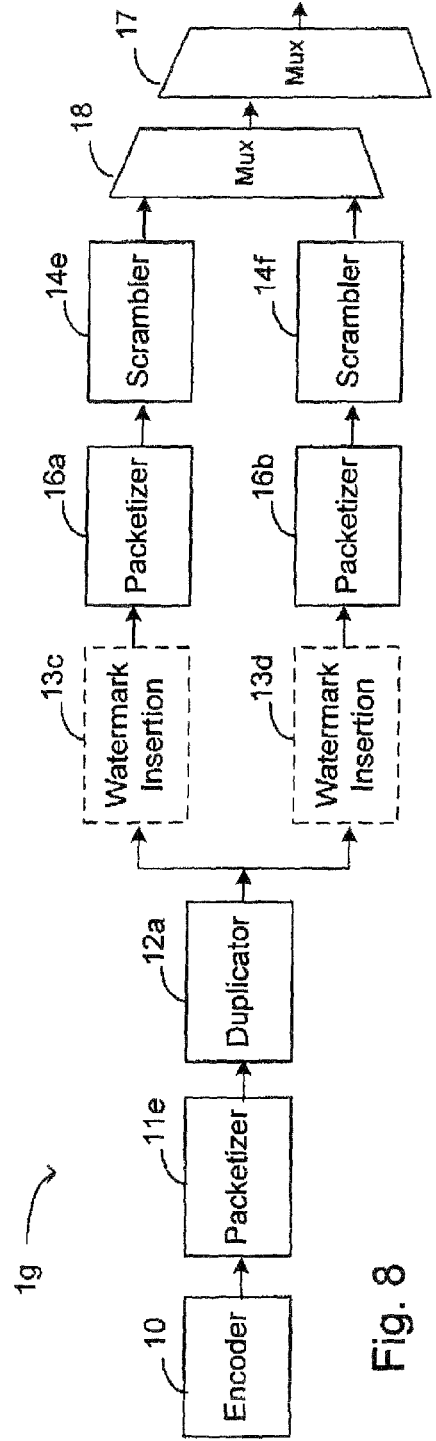
FIG. 8 shows a headend system of an exemplary embodiment of the invention, wherein a digital signal is packetized before being copied and wherein watermarked data packets are converted into smaller data packets before being scrambled.

FIG. 8 shows a headend system 1g of an exemplary embodiment of the invention that is arranged for an alternative scrambling process, wherein the entire PES packet including the PES header is scrambled. A CW control part 20 as shown in FIG. 1 is not shown in FIG. 8, but is typically a part of the headend system 1g. The alternative scrambling process enables scrambling in the headend system 1g at the PES level and descrambling in the receiver at TS level.

Similar to the exemplary embodiment of FIG. 7, in FIG. 8 the digital signal is packetized into PES packets in first packetizer 11e. PES packets are copied in duplicator 12a and each copy is processed in a (optional) watermarking and scrambling chain.

In the headend system 1g the thus created PES packets are further processed by second packetizer 16a,16b, scrambler 14e,14f, PES level multiplexer 18 and TS level multiplexer 17 as described in the example of FIG. 4.

It is possible to arrange the head-end system 1,1a,1b,1c, 1d,1e,1f,1g to duplicate, watermark (optionally) and scramble only a portion of the digital signals or PES packets, e.g., on demand, for selected parts of the digital signal or within a predefined time frame. This reduces the bandwidth of the content stream, as not all PES packets will have copies in the content stream.

Figure 9:
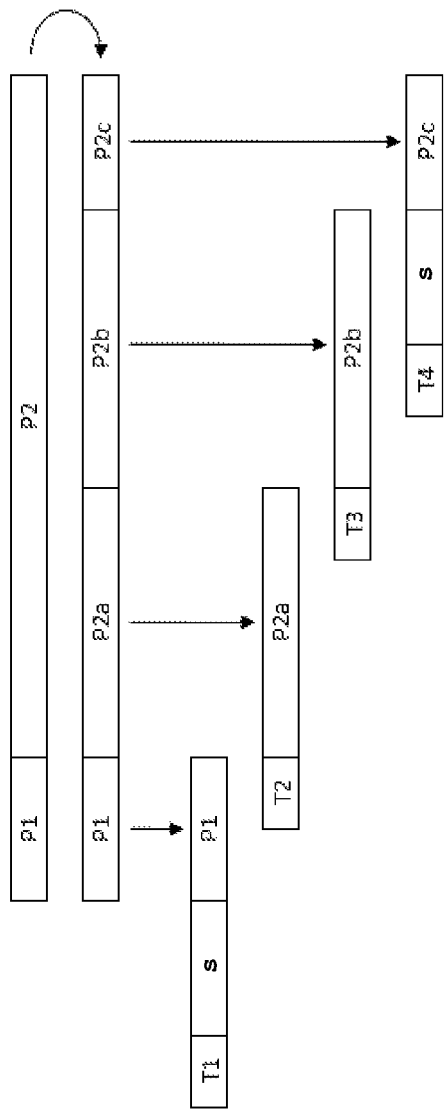
FIG. 9 shows the conversion of data packets in an exemplary embodiment of the invention, wherein data packets are converted into smaller data packets.

FIG. 9 shows how a PES packet can be packetized into multiple TS packets by second packetizer module 16,16a, 16b. FIG. 9 is not to be interpreted as having a time axis from left to right; the TS packets are typically concatenated to form a single stream of TS packets.

The TS packets have a fixed predefined payload length. To accommodate the PES packet in the multiple smaller TS packets, the PES packet is divided into smaller parts. The PES packet has a PES header P1 and a PES payload P2. The PES payload P2 is divided in multiple equally sized parts and a remainder part. In the example of FIG. 3 the PES payload P2 is divided in two equally sized parts P2a and P2b and a remainder part P2c. The parts P2a and P2b have a length equal to the predefined payload length of the TS packets.

The header P1 of the PES packet is placed in the payload of a first TS packet having a TS header T1. If the header is smaller than the predefined payload length, then the PES header is stuffed with stuff bits s in a manner known per se. If the header is larger than the payload size, the header is split and divided over multiple TS packets and stuffed with stuff bits if needed. A second TS packet is generated with a TS header T2 and having P2a as payload. A third TS packet is generated with a TS header T3 and having P2b as payload. A fourth TS packet is generated with a TS header T4 and having P2c as payload. The remainder part P2c is stuffed with stuff bits s in a manner known per se to match the size of the predefined payload length. If the PES packet is scrambled, the scrambling control field of the PES packet header P1 is copied to all TS packet headers T1,T2,T3,T4. This enables a receiver of the TS packets to detect that the payload of the TS packets is scrambled.

The group of TS packets carrying a single PES packet is scrambled with transport stream scrambler 14e,14f, i.e. the payload of each TS packet is scrambled. The scrambled TS packets are then multiplexed in PES level multiplexer 18 with TS packets from other PES packet processing chains. As all TS packets form a single stream, the PES level multiplexer 18 needs to preserve the grouping of the TS packets containing a PES packet. Hereto the second packetizer 16a,16b adds, e.g., a known payload_unit_start_indicator bit to the first TS packet header T1 enabling the multiplexer 18 to detect the start of a new series of TS packets. Alternatively the second packetizer 16a,16b provides PES grouping information to the multiplexer 18 to ensure that all TS packets transporting a PES packet are kept together. The grouping of TS packets can be used to trigger the desired error handling processing in the receiver, as will be described later.

As shown in the exemplary embodiments of FIGS. 1-8, the headend system scrambles each of the copies of the digital signal differently. The copies are multiplexed into a content stream and the content stream is provided to one or more receivers. A receiver is implemented with a particular encryption scheme enabling decryption of one of the copies of the digital signal and/or provided with only one CW for descrambling one of the copies of the digital signal. To the receiver a part of the content stream is thus scrambled in an unknown encryption scheme and/or with a 'wrong' CW. In the receiver this results in the generation of a descrambled content stream with 'random' data parts that have not been descrambled correctly, which will trigger an error handling facility in the receiver. Typically, the introduced error produces a detectable event in the analogue output. The presence or absence of an error in the analogue output can be interpreted as a binary '0' or '1'. The analogue output distortions form a very rough approximation of a watermark.

As shown in the exemplary embodiments of FIGS. 1-8, optionally the headend system watermarks each copy of the digital signal. The error handling in the receiver skips over longer error sequences caused by descrambling parts of the content stream with an unknown encryption scheme and/or incorrect CW and resumes the descrambling at a next valid synchronization point, e.g., at a next valid PES header. The analogue output after descrambling in the receiver contains the watermarks forming a fingerprint that typically cannot be detected by human.

Error handling in a receiver is typically implemented in a decompression module involved in the decoding of digital signals into analog signals. When the error handling module detects a longer sequence of bits that do not conform to a compression syntax, the error handler will skip data until it detects the next valid synchronization point. The error handler will then return control to the decompression module which resumes normal decoding.

As the error handling skips to the next synchronization point, it is beneficial if the fingerprinting scheme operates on packets that are aligned with a synchronization point. PES packets in MPEG-2 have such synchronization points. Similar packetization is possible with other compression formats, i.e. other than MPEG-2. Operating the watermarking scheme at the PES level enables the creation of two PES packets that are transmitted as separate packets and each copy is scrambled with a different CW. At the receiver only a single CW is used to descramble both packets resulting in one properly encoded PES packet and one PES packet consisting of random data. The error handling module will skip over the PES packet with random data; hence, the decompression module only receives the properly descrambled PES packet. Effectively the error handling module has removed the PES packet encrypted with another CW from the stream.

This surprising result of the error handler functionality in the receiver is used to create two alternative encodings for the same PES packet, where each PES packet optionally contains a different watermarking pattern. Scrambling each of the PES packets with a different CW value enables the receiver to selectively delete all unwanted PES packets from the stream.

Figure 10:
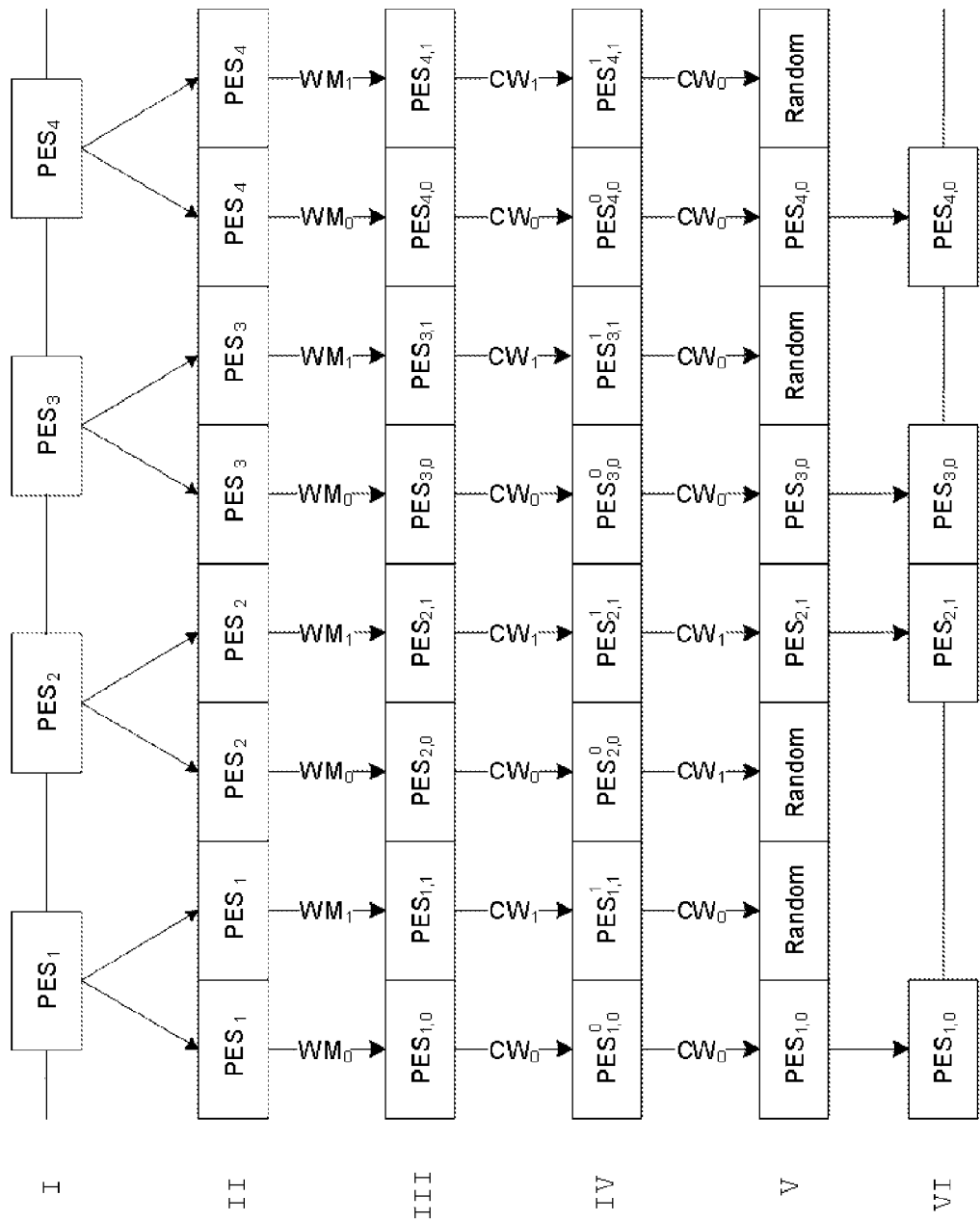
FIG. 10 shows and example of how PES packets can be processed at different stages of processing in a headend system and a receiver.

FIG. 10 shows an example of how PES packets are processed at different stages of processing in the headend system $1f$ and in a receiver. A packetized digital signal in the form of an unprocessed PES stream in headend system $1f$ is shown in line I and contains multiple PES packets $PES_1$, $PES_2$, $PES_3$ and $PES_4$. Each PES packet $PES_1$, $PES_2$, $PES_3$ and $PES_4$ is duplicated into two copies as shown in line II. It is possible to have the headend system create three or more copies of each PES packet.

In the example of FIG. 10 each instance of a duplicated PES packet is processed to encode a different watermark $WM_0$, $WM_1$. The resulting watermarked PES packets are shown in line III. In the example of FIG. 10 each PES packet has an even ('0') and an odd ('1') watermarked instance. The copy of PES packet $PES_1$ watermarked with the binary value '0' is shown in line III as $PES_{1,0}$. The copy of PES packet $PES_1$ watermarked with the binary value '1' is shown in line III as $PES_{1,1}$. Similarly, the second, third and fourth copies are watermarked as shown in line III.

Each watermarked instance of a PES packet is scrambled with a different CW for each copy of a PES. The resulting scrambled PES packets are shown in line IV. In the example of FIG. 10 a PES packet with an even watermark $WM_0$ is scrambled using a corresponding even control word $CW_0$, which is indicated in line IV by a superscript '0', e.g., $PES^0_{1,0}$. A PES packet with an odd watermark $WM_1$ is scrambled using a corresponding odd control word $CW_1$, which is indicated in line IV by a superscript '1', e.g., $PES^1_{1,0}$.

After transmission of the watermarked and scrambled PES packets to the receiver, which may involve packetizing of the PES packets into TS packets as shown in FIG. 9, the PES packets are received and processed by the receiver. To enable the receiver to descramble the PES packets, the headend system transmits CWs to the receiver, e.g., in separate entitlement messages such as ECMs. Depending on the received CW value, one copy of a PES packet is descrambled properly and the other copy descrambles to random data. The result after descrambling in the receiver is shown in line V. In the example of FIG. 10 the receiver was able to obtain $PES_{1,0}$ using $CW_0$, while $PES_{1,1}$ could not be obtained using the $CW_0$. Descrambling of $PES_{1,1}$ with $CW_0$ thus results in random data.

Random data generated by the descrambler in the receiver triggers an error handling module in the receiver to wait for the next correctly descrambled PES packet and skip over the random data. When the next PES packet is detected, the receiver resumes processing of received PES packets. Effectively, hereby the random data is removed from the descrambled data by the error handler. The resulting PES stream at the receiver is show in line VI. The resulting PES stream can be input to a decoder for generating an output for display on an end-user device, such as, e.g., a video output, audio output, EPG output, or a combination of video and audio in a television output.

Detection of a distortion in the descrambled output as a result of the error handler being activated can be used to construct a binary pattern. Such distortion is typically not detectable by human observation, but can be detected with detection equipment. Each correctly descrambled PES packets corresponds, e.g., to a binary '1' and each incorrect descrambled PES packet corresponds, e.g., to a binary '0'. In this case no watermark needs to be encoded in the PES packet to enable a fingerprint to be generated.

In the example of FIG. 10 a watermark has been inserted into the PES packets by the headend system, which enables the fingerprint to be detected in the analog output of the receiver. Decoding the resulting PES stream, i.e. $PES_{1,0}$, $PES_{2,1}$, $PES_{3,0}$ and $PES_{4,0}$ results in an analog signal containing a fingerprint with binary value "0100", which individual bit values are derivable from the analog signal.

The invention is not limited to watermarking applications. Instead of creating variants of a PES with different watermarks, it is possible to, e.g., create variants of a PES using different scrambling algorithms or encoding algorithms. A receiver capable of, e.g., descrambling using a particular scrambling algorithm is capable of descrambling only one of the variants of the PES. The headend system provides the received with CWs for descrambling the supported PES variants. Descrambling the non-supported PES variants with the provided CWs results in random data, which the error handler processes as described.

The generation of the PES stream, optionally including the generation of a fingerprint, at a receiver is determined by the sequence of CWs used to descramble the received data stream. There are many known methods to deliver CWs to a receiver. One way is to send an entitlement control message (ECM) to a smartcard which will return a CW for use in the descrambler of the receiver.

Figure 11:
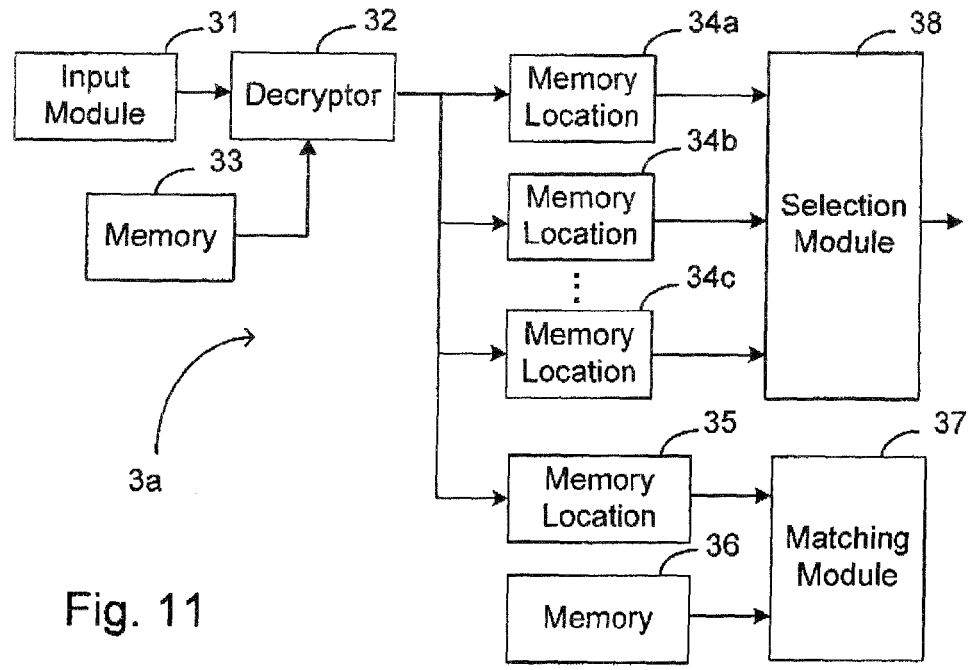
FIG. 11 shows a smartcard of an exemplary embodiment of the invention.

In the example shown in FIG. 11 a smartcard 3a is arranged to receive a number of CWs and selection data in an ECM. The smartcard 3a is arranged to select a particular CW to be used for descrambling in the receiver based on a comparison of a locally stored fingerprint vector with the selection data contained in the ECM.

The smartcard 3a receives the ECM in input module 31. The ECM is decrypted in decryptor 32 using a local key $P_K$ stored in a memory 33. From the ECM a set of CWs and selection data are thus obtained. The CWs are stored in a temporary memory, e.g., at memory locations 34a, 34b and 34c. The selection data is stored in the temporary memory at memory location 35. A fingerprint vector representing an identity of the smartcard 3a is stored in a memory 36. It will be understood that memories 33 and 36 and temporary memory locations 34a, 34b, 34c and 35 can be implemented in a single memory module or in multiple memory modules in any manner known per se.

The selection data is matched in a matching module 37 with the fingerprint vector. The output of the matching module 37 is used by a selection module 38 to select a particular CW from the CWs stored in the temporary memory locations 34a, 34b and 34c. The selected CW is provided to the receiver, which is indicated by the arrow leaving the selection module 38.

In the receiver the descrambler uses the selected CW to generate a descrambled content stream that optionally results in a particular fingerprint in the analogue output of the receiver.

The CWs and watermarks used to create the content stream in the headend system and the ECM containing the CWs and the selection data can be determined by the headend system such that the fingerprint pattern in the analog output of the receiver corresponds to the fingerprint vector stored in the smartcard.

Figure 12:
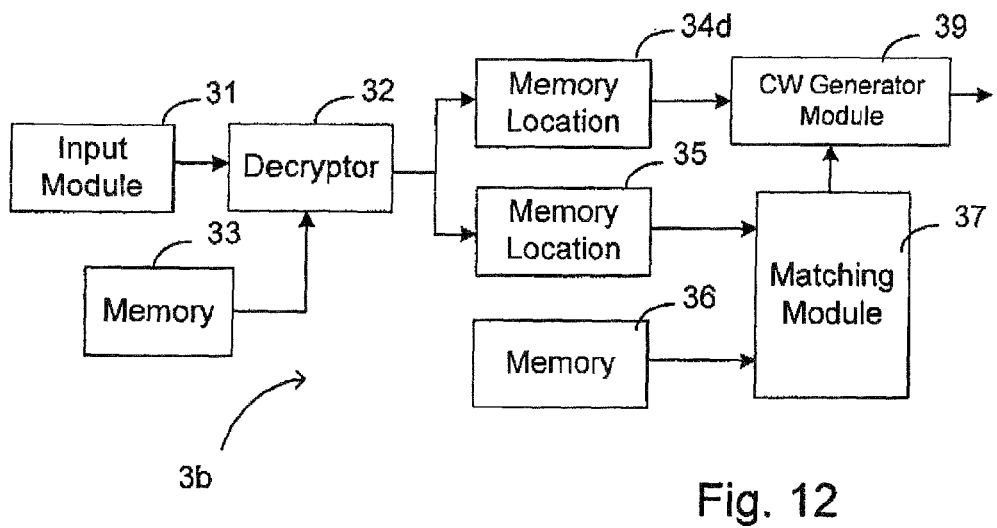
FIG. 12 shows a smartcard of an exemplary embodiment of the invention.

In the example shown in FIG. 12 a smartcard 3b is arranged to receive an ECM containing a seed value and selection data. The smartcard 3b is arranged to generate a particular CW value based on the received seed value and a matching of a locally stored fingerprint vector with the selection data contained in the ECM.

The smartcard 3b receives the ECM in input 31. The ECM is decrypted in decryptor 32 using a local key $P_K$ stored in a memory 33. From the ECM the seed value and the selection data are thus obtained. The seed value is stored in a temporary memory at a memory location 34d. The selection data is stored in the temporary memory at memory location 35. The selection data is matched in a matching module 37 with a locally stored fingerprint vector stored in a memory 36. It will be understood that memories 33 and 36 and temporary memory locations 34d and 35 can be implemented in a single memory module or in multiple memory modules in any manner known per se.

CW generator module 39 is configured with a function that generates a CW using as input the seed value and the result of the matching module 37. The generated CW is provided to the receiver, which is indicated by the arrow leaving the CW generation module 39.

In the examples of FIG. 11 and FIG. 12 two implementations of a smartcard 3a,3b are shown that can be used at a receiver side for the generation of a particular fingerprint in the analog output of the receiver. The invention is not limited to the use of one of the smartcards 3a and 3b. Any other implementation of a smartcard can be used for the provisioning of a particular CW to a receiver, as long as the headend system is in control of the selection or generation of the CW via the selection data in the ECM. Moreover, it is possible to use existing smartcards in case the headend system provides the receiver with, e.g., an ECM containing only the particular CW, in which case the smartcard does not need to select a particular CW as this selection is already made by the headend system.

Figure 13:
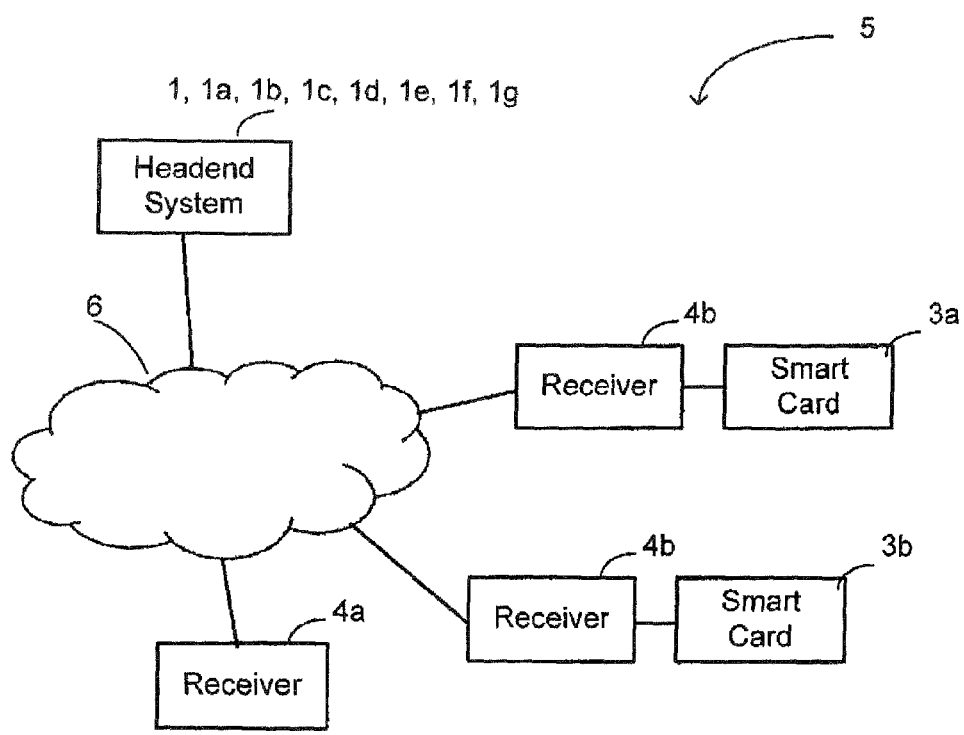
FIG. 13 shows a conditional access system of an exemplary embodiment of the invention.

FIG. 13 shows a conditional access system 5 of an exemplary embodiment of the invention. A headend system having the functionality of one of the headend systems 1, 1a, 1b, 1c, 1d, 1e, 1f or 1g shown in FIGS. 1-8 is connected to a communication network 6. The communication network 6 is, e.g., a DVB network or any other network suitable for the transmission of content streams and possibly entitlement messages. One or more receivers 4a,4b are connected to the communication network 6 for the reception of a content stream and an entitlement message from the headend system. Receiver 4a has functionality similar to the smartcard 3a,3b as shown in FIGS. 11-12 embedded. Receiver 4b is communicatively connected to a smartcard having functionality similar to the smartcard 3a,3b as shown in FIGS. 11-12.

Figure 14:
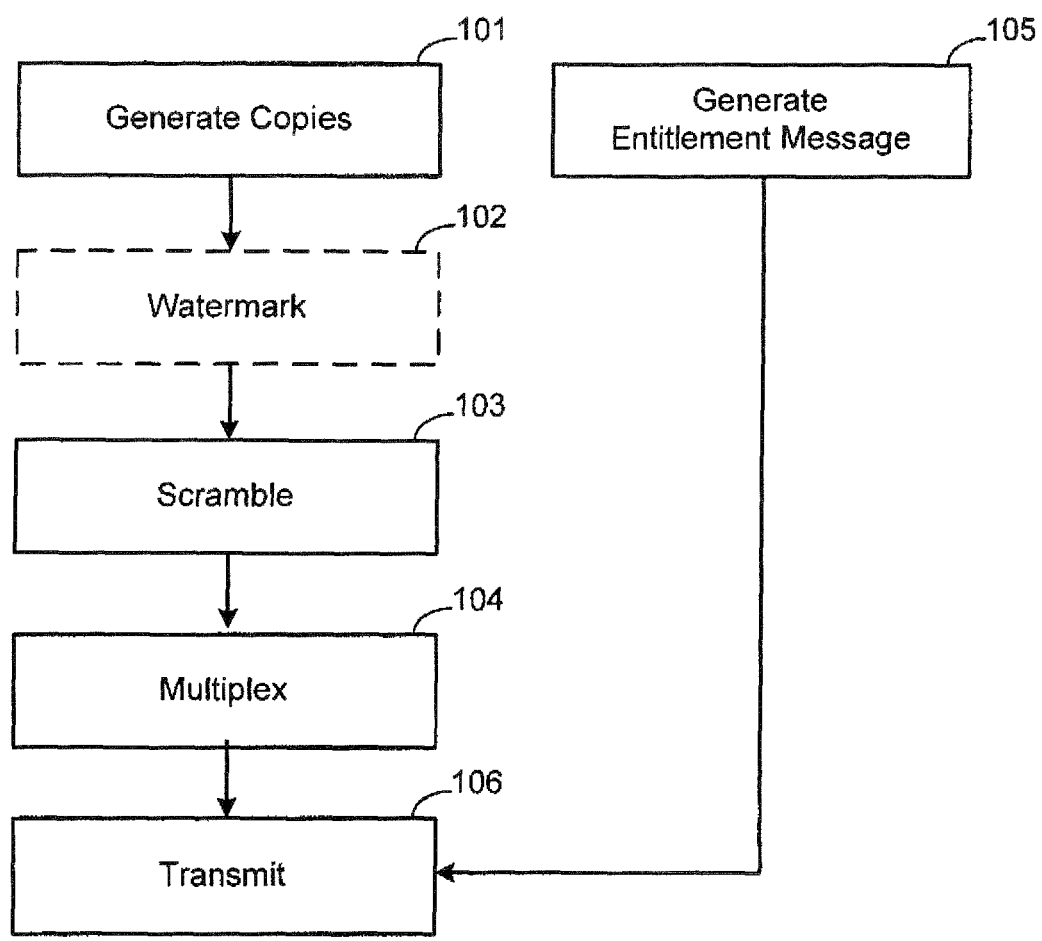
FIG. 14 shows a flow chart of steps of a method performed by a headend system of an exemplary embodiment of the invention.

FIG. 14 shows a flow chart of steps of a method performed by a headend system of an exemplary embodiment of the invention. The steps of the method are described in detail in the examples of FIGS. 1-8. The headend system generates in step 101 two or more copies of at least a part of a digital signal. In step 103 each copy of the digital signal is scrambled using an encryption key to obtain a scrambled digital signal, wherein the encryption key is different for each copy of the digital signal. Optionally each copy of the digital signal is watermarked in step 102 before scrambling 103 the signal by inserting a watermark in the digital signal to obtain a watermarked digital signal, wherein the watermark is different for each copy of the digital signal. The scrambled digital signals of the copies of the digital signal are multiplexed in step 104 to obtain a content stream. In step 105 an entitlement message is generated comprising key data for at least one of the encryption keys to enable a receiver of the entitlement message and the content stream to obtain a decryption key for descrambling one copy of the digital signal. In step 106 the content stream and the entitlement message are transmitted to one or more receivers.

Figure 15:
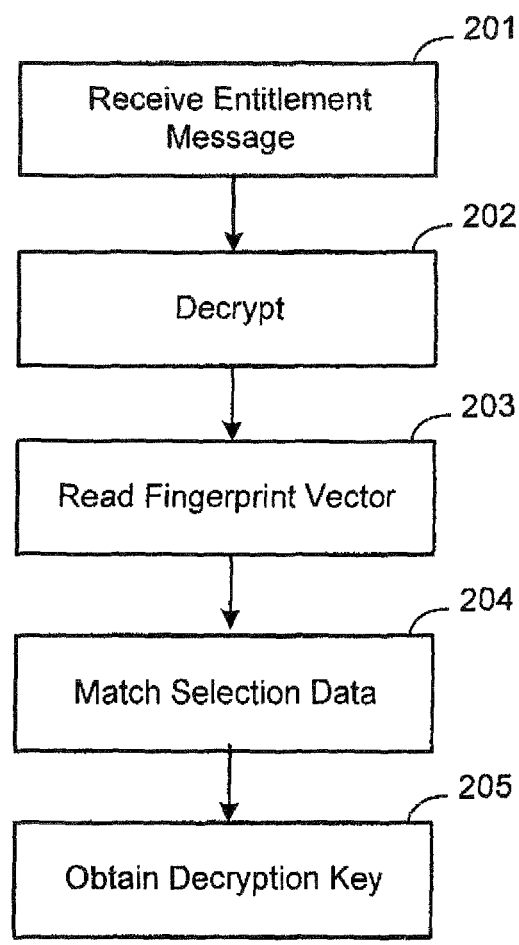
FIG. 15 shows a flow chart of steps of a method performed by a smartcard of an exemplary embodiment of the invention.

FIG. 15 shows a flow chart of steps of a method performed by a smartcard of an exemplary embodiment of the invention. The steps of the method are described in detail in the examples of FIGS. 11-12. In step 201 the smartcard receives an entitlement message from a receiver. The entitlement message is decrypted in step 202. Thereby key data is obtained for two or more decryption keys and selection data. In step 203 a fingerprint vector is read from a memory. The selection data is matched in step 204 with the fingerprint vector to obtain a matching result. In step 205 one decryption key is obtained from the key data using the matching result to enable the receiver to descramble one copy of a digital signal from a content stream comprising two or more scrambled copies of the digital signal.

In the examples and exemplary embodiments reference is made to MPEG-2 compression and multiplexing techniques and associated DVB scrambling techniques. The invention is not limited to the MPEG-2 encoding format and DVB, but can be used with other techniques for digital audio and video transmission.

Digital TV encoding formats in general enable decoding to begin at a random point of the stream by searching for a predefined encoding pattern. Such synchronization points are also used to support trick modes enabling fast forwarding and rewinding. The synchronization points represent the equivalence of PES packets in MPEG-2. After decoding the elementary stream following a synchronization point, the decoder expects a next synchronization point. The decoder generally ignores data with an unknown or missing synchronization point and continues to scan for a next synchronization point.

Figure 16:
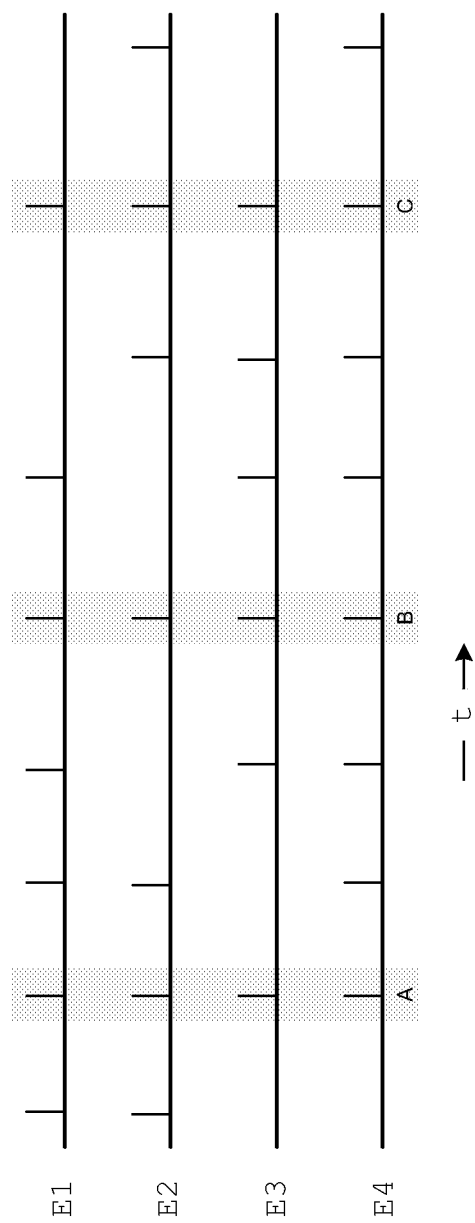
FIG. 16 shows an example of different sequences of synchronization points in different receivers.
Figure 17:
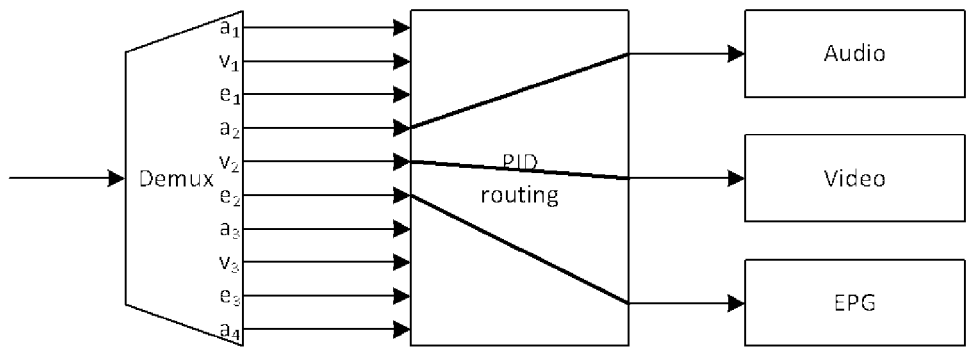
FIG. 17 shows a prior art example of processing PES streams in a receiver.
Figure 18:
FIG. 18 shows a prior art example of three PID streams from which a receiver can form a single elementary stream.
Figure 19:
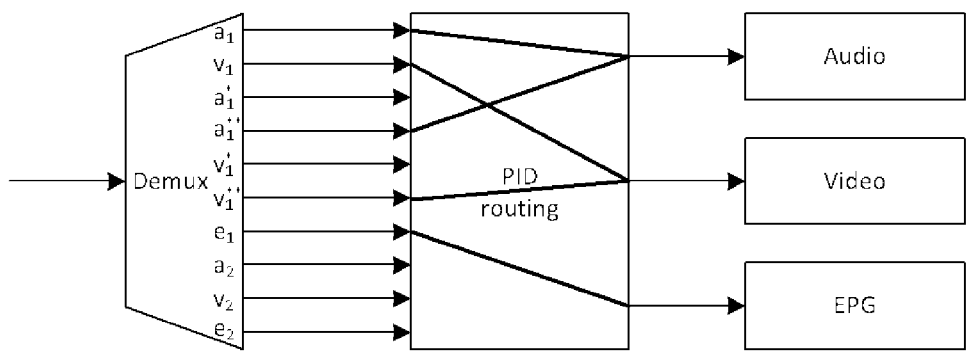
FIG. 19 shows a prior art example of PID switching in a receiver.

As explained, the invention uses error handling capabilities of a receiver to skip over copies of the digital signal that have been descrambled with a 'wrong' decryption key. Different decompression implementations in different receivers may use synchronization points at different points of the content stream to find the next part, e.g., a next copy of a PES packet or the first copy of a next PES packet, in the content stream to descramble. FIG. 16 shows an example of four different decompression engines in four receivers. The synchronization points for a number of decompression implementations of the same content stream are indicated by vertical lines on the time axes.

FIG. 16 shows different sequences of synchronization points for decompression engines E1, E2, E3 and E4. In the example of FIG. 16 there are a three synchronization points A, B and C that are commonly recognized by all decompression engines E1, E2, E3 and E4. The synchronization points A, B and C are thus part of a common set of synchronization points that all decompression implementations will recognize as such. Such a common set can be determined for all decompression implementations of a given content compression encoding format, such as, e.g., MPEG-2. A headend system can make use of the knowledge of the common set of synchronization points.

Scrambling in accordance with a particular content compression encoding format generally provides for a key delivery model and a key synchronization facility. Such existing key delivery and synchronization infrastructure can be used to signal the headend system when scrambling of copies of the digital signal and optionally watermarking the copies is possible. This ensures that all receivers of the content stream are able to generate a fingerprint in accordance with the invention.

What is claimed is:

1. A headend system comprising:
   a duplicator configured to generate two or more copies of at least a part of a first digital signal;
   one or more scramblers configured to scramble each copy to obtain scrambled copies, wherein each copy is scrambled differently; and
   a combiner configured to combine the scrambled copies to obtain a second digital signal within which the scrambled copies are not identifiable as being related to one of the two or more copies of the at least a part of the first digital signal so that descrambling, at a receiver of the second digital signal, of the scrambled copies using a decryption key for one of the scrambled copies descrambles said one of the scrambled copies into a meaningful output and all other scrambled copies into a non-meaningful output that an error handler of the receiver discards.

2. The headend system according to claim 1, further comprising one or more first packetizers configured to packetize each copy of the at least a part of the first digital signal into a data packet,
   wherein the one or more scramblers are configured to scramble a payload of each data packet to obtain scrambled data packets,
   and wherein the combiner comprises a multiplexer and the second digital signal comprises a content stream, the multiplexer being configured to multiplex the scrambled data packets to obtain the content stream.

3. The headend system according to claim 2, further comprising:
   one or more watermark insertion modules are configured to insert the watermark in the payload of each data packet to obtain watermarked data packets,
   wherein the one or more scramblers are configured to scramble the payload of each watermarked data packet.

4. The headend system according to claim 1, further comprising a first packetizer configured to packetize the first digital signal into data packets, wherein the duplicator is configured to generate two or more copies of one or more of the data packets,
   wherein the one or more scramblers are configured to scramble a payload of each copy to obtain scrambled copies of the one or more of the data packets,
   and wherein the combiner is a multiplexer and the second digital signal is a content stream, the multiplexer being configured to multiplex the scrambled data packets to obtain the content stream.

5. The headend system according to claim 4, further comprising:
   one or more watermark insertion modules configured to insert the watermark in the payload of each copy to obtain watermarked copies of the one or more of the data packets,
   and wherein the one or more scramblers are configured to scramble the payload of each watermarked data packet.

6. The headend system according to claim 2, further comprising one or more second packetizers for packetizing each data packet into one or more further data packets, wherein each further data packet comprises a further payload with a predefined length, wherein the one or more second packetizers are configured to:
   determine a header length of a header of the data packet and, if the header length is not equal to or a multiple of the predefined length, add one or more stuffing bits to the header such that the header length becomes equal to a the multiple of the predefined length;
   determine a payload length of the payload of the data packet and, if the payload length is not equal to or a multiple of the predefined length, add one or more stuffing bits to the payload such that the payload length becomes equal to a the multiple of the predefined length;
   split the header into one or more header parts having the predefined length;
   split the payload into one or more payload parts having the predefined length; and
   sequentially place the one or more header parts and the one or more payload parts in the further payload of the further data packets,
   wherein the one or more scramblers are configured to scramble the further payload of each further data packet, and
   wherein the multiplexer is further configured to group the further data packets.

7. The headend system according to claim 1, further comprising a key generator and an entitlement message generator, wherein the key generator is configured to provide one or more encryption keys to the one or more scramblers for scrambling each copy, and wherein the entitlement message generator is configured to generate an entitlement message comprising key data for the one or more of the encryption keys to enable a receiver of the entitlement message and the second digital signal to obtain a decryption key for descrambling one of the scrambled copies into a meaningful output and to descramble all other scrambled copies into a non-meaningful output.

8. The headend system according to claim 7, further comprising a selection data generator configured to generate selection data, the selection data enabling the receiver to obtain one decryption key from the key data, and wherein the entitlement message generator is further configured to include the selection data in the entitlement message.

9. A receiver for receiving a second digital signal and an entitlement message from a headend system according to claim 8, the second digital signal comprising two or more scrambled copies of at least a part of a first digital signal, wherein the scrambled copies are not identifiable as being related to one of two or more copies of the at least a part of the first digital signal, the entitlement message comprising key data for two or more decryption keys, the entitlement message further comprising selection data, the receiver comprising:
  a decryptor configured to obtain the key data and the selection data from the entitlement message;
  a memory comprising a fingerprint vector;
  a matching module configured to match the selection data with the fingerprint vector to obtain a matching result;
  a key selector configured to obtain one decryption key from the key data based on the matching result to enable the receiver to descramble one of the scrambled copies into a meaningful output and to descramble all other scrambled copies into a non-meaningful output; and
  an error handler configured to discard the non-meaningful output.

10. A hardware smartcard for use in a receiver for receiving a second digital signal and an entitlement message from a headend system according to claim 8, the second digital signal comprising two or more scrambled copies of at least a part of a first digital signal, wherein the scrambled copies are not identifiable as being related to one of two or more copies of the at least a part of the first digital signal, the entitlement message comprising key data for two or more decryption keys, the entitlement message further comprising selection data, the smartcard comprising:
  an input module configured to receive the entitlement message from the receiver;
  a decryptor configured to obtain the key data and the selection data from the entitlement message;
  a memory comprising a fingerprint vector;
  a matching module configured to match the selection data with the fingerprint vector to obtain a matching result; and
  a key selector configured to obtain one decryption key from the key data based on the matching result to enable the receiver to descramble one of the scrambled copies into a meaningful output and to descramble all other scrambled copies into a non-meaningful output that an error handler of the receiver discards.

11. A conditional access system comprising:
  a headend system, wherein the headend system comprises:
    a duplicator configured to generate two or more copies of at least a part of a first digital signal;
    one or more scramblers configured to scramble each copy to obtain scrambled copies of the at least a part of the first digital signal, wherein each copy is scrambled differently; and
    a combiner configured to combine the scrambled copies to obtain a second digital signal within which the scrambled copies are not identifiable as being related to one of the two or more copies of the at least a part of the first digital signal so that descrambling, at a receiver of the second digital signal, of the scrambled copies using a decryption key for one of the scrambled copies descrambles said one of the scrambled copies into a meaningful output and all other scrambled copies into a non-meaningful output that an error handler of the receiver discards; and
  one or more receivers according to claim 9.

12. A method for use in a headend system, the method comprising the steps of:
  generating two or more copies of at least a part of a first digital signal;
  scrambling each copy to obtain scrambled copies of the least a part of the first digital signal, wherein each copy is scrambled differently; and
  combining the scrambled copies to obtain a second digital signal within which the scrambled copies are not identifiable as being related to one of the two or more copies of the least a part of the first digital signal so that descrambling, at a receiver of the second digital signal, of the scrambled copies using a decryption key for one of the scrambled copies descrambles said one of the scrambled copies into a meaningful output and all other scrambled copies into a non-meaningful output that an error handler of the receiver discards.

13. The method according to claim 12, further comprising the steps of:
  generating an entitlement message comprising key data for one or more encryption keys to enable a receiver of the entitlement message and the second digital signal to obtain a decryption key for descrambling one of the scrambled copies into a meaningful output and to descramble all other scrambled copies into a non-meaningful output; and
  transmitting the second digital signal and the entitlement message to one or more receivers.

14. A method for use in a hardware smartcard the method comprising the steps of:
  receiving an entitlement message from a receiver, the entitlement message comprising key data for two or more decryption keys, the entitlement message further comprising the selection data;
  decrypting the entitlement message to obtain the key data and the selection data;
  reading the fingerprint vector from a memory;
  matching the selection data with the fingerprint vector to obtain a matching result; and
  obtaining the one decryption key from the key data based on the matching result to enable the receiver to descramble a first scrambled copy of a digital signal into the meaningful output and to descramble a second scrambled copy of the digital signal into the non-meaningful output that an error handler of the receiver discards.

15. The headend system according to claim 1, further comprising:
  one or more watermark insertion modules configured to insert a watermark in each copy to obtain watermarked copies of the at least a part of the first digital signal, wherein the watermark is different for each copy.

16. The method according to claim 12, further comprising:
  inserting a watermark in each copy to obtain watermarked copies of the at least a part of the first digital signal, wherein the watermark is different for each copy.

17. A non-transitory computer readable storage medium storing one or more programs, the one or more programs comprising instructions which, when executed by a computer processor cause the computer processor to perform a method comprising:

generating two or more copies of at least a part of the first digital signal;

scrambling each copy to obtain scrambled copies of the at least a part of the first digital signal, wherein each copy is scrambled differently; and combining the scrambled copies to obtain a second digital signal within which the scrambled copies are not identifiable as being related to one of the two or more copies of the at least a part of the first digital signal so that descrambling, at a receiver of the second digital signal, of the scrambled copies using a decryption key for one of the scrambled copies descrambled said one of the scrambled copies into a meaningful output and all other scrambled copies into a non-meaningful output that an error handler of the receiver discards.

18. A conditional access system comprising:

a headend system, wherein the headend system comprises:

a duplicator configured to generate two or more copies of at least a part of a first digital signal;

one or more scramblers configured to scramble each copy to obtain scrambled copies of the at least a part of the first digital signal, wherein each copy is scrambled differently; and a combiner configured to combine the scrambled copies to obtain a second digital signal within which the scrambled copies are not identifiable as being related to one of the two or more copies of the at least a part of the first digital signal so that descrambling, at a receiver of the second digital signal, of the scrambled copies using a decryption key for one of the scrambled copies descrambles said one of the scrambled copies into a meaningful output and all other scrambled copies into a non-meaningful output that an error handler of the receiver discards;

one or more receivers; and one or more hardware smartcards according to claim 10.

* * * * *